US010916955B1

(12) United States Patent
Scatino et al.

(10) Patent No.: US 10,916,955 B1
(45) Date of Patent: Feb. 9, 2021

(54) MODULAR MULTI-FUNCTIONAL CONFERENCE WEARABLE SYSTEM

(71) Applicant: S & N Technologies, LLC, Scottsdale, AZ (US)

(72) Inventors: Nicolas A. Scatino, Scottsdale, AZ (US); Steven Scatino, Scottsdale, AZ (US); Chris Buttenob, Scottsdale, AZ (US)

(73) Assignee: S & N Technologies, LLC, Scottsdale, AZ (US)

( * ) Notice: Subject to any disclaimer, the term of this patent is extended or adjusted under 35 U.S.C. 154(b) by 0 days.

(21) Appl. No.: 16/158,921

(22) Filed: Oct. 12, 2018

Related U.S. Application Data

(60) Provisional application No. 62/572,980, filed on Oct. 16, 2017.

(51) Int. Cl.

*H02J 7/00* (2006.01)
*A45F 5/02* (2006.01)
*H02J 7/34* (2006.01)
*A45F 5/00* (2006.01)

(52) U.S. Cl.

CPC .............. *H02J 7/0045* (2013.01); *A45F 5/02* (2013.01); *H02J 7/0047* (2013.01); *H02J 7/342* (2020.01); *A45F 2005/006* (2013.01); *A45F 2200/055* (2013.01); *H02J 7/00* (2013.01); *H02J 7/0048* (2020.01)

(58) Field of Classification Search

CPC ...... H02J 7/0044; H02J 7/0045; H02J 7/0047; H02J 7/0054; H02J 7/00; H02J 7/0031; H02J 7/0042; H02J 2007/005; H02J 2007/0062; H02J 7/0048; H02J 7/342; A45C 13/02; A45C 2011/001; A45C 2011/002; A45C 2001/065; A45C 5/02; A45C 2200/055; A45C 2005/006

See application file for complete search history.

(56) References Cited

U.S. PATENT DOCUMENTS 4,382,220 A * 5/1983 Marshall ................ F21L 4/085 320/112
5,010,665 A * 4/1991 Clinkscales ........ A44C 15/0015 40/1.5
9,521,223 B1 * 12/2016 Rajagopalan ........... H04W 4/80
9,581,972 B1 * 2/2017 Arrow ................ H01M 10/425

(Continued)

*Primary Examiner* — Helen Rossoshek

(74) *Attorney, Agent, or Firm* — Brick Gentry PC; Brian J. Laurenzo; Jessica L Susie

(57) ABSTRACT

A multi-functional wearable with modular attachments is provided. A case with a first and second connector are provided that can each connect to one or more removable modules, such as a charging cable, lanyard, body strap, name badge, key ring, power brick, and/or battery module. The battery module includes a control panel with a power button to control power from the battery and one or more status LEDs to indicate the charge status of the battery. The battery module also provides storage to hold a cable and/or device. Alternatively, magnets and a first female receptacle that compliments and receives a male connector from a lanyard and a second female connector to connect to another cable may be utilized. The charging cable may be surrounded by fabric or similar material and the charging cable ends may also include one or more magnets or mechanical protrusions.

21 Claims, 15 Drawing Sheets

(56) References Cited

U.S. PATENT DOCUMENTS 9,612,617 B1 * 4/2017 Jaulerry .................. G06F 1/163
10,461,289 B2 * 10/2019 Thiel ................... H01M 2/1061
10,476,054 B2 * 11/2019 Thiel ...................... A45C 3/001
2010/0245585 A1 * 9/2010 Fisher ................. H04M 1/6066
348/164
2015/0200554 A1 * 7/2015 Marks ................... H02J 7/0044
320/108
2015/0205327 A1 * 7/2015 Daley, III ............. G06F 1/1698
361/679.03
2016/0294225 A1 * 6/2016 Blum et al. ............. H02J 50/12
320/108
2016/0320795 A1 * 11/2016 Daley, III ............. G06F 1/1616
2016/0329533 A1 * 11/2016 Tajima ................ H01M 2/0275
2016/0372717 A1 * 12/2016 Noda .................... H01M 2/026
2017/0170859 A1 * 6/2017 Noori ................... H04B 1/3883
2017/0229692 A1 * 8/2017 Thiel ..................... H01L 31/048
2017/0287311 A1 * 10/2017 Suryan ................... G08B 21/24
2018/0062197 A1 * 3/2018 Thiel ....................... H02S 40/42
2018/0070693 A1 * 3/2018 Bloomfield .......... A45C 7/0086
2018/0102656 A1 * 4/2018 Thiel ................... H01M 10/425
2018/0233016 A1 * 8/2018 Daniel ................. G08B 25/016
2019/0081493 A1 * 3/2019 Thiel .................... H05K 5/0239
2019/0111255 A1 * 4/2019 Errico ................ A61N 1/36014

* cited by examiner 100
102
103

110
112
118
120
122
124
104
150
116
119
126
118
114
130

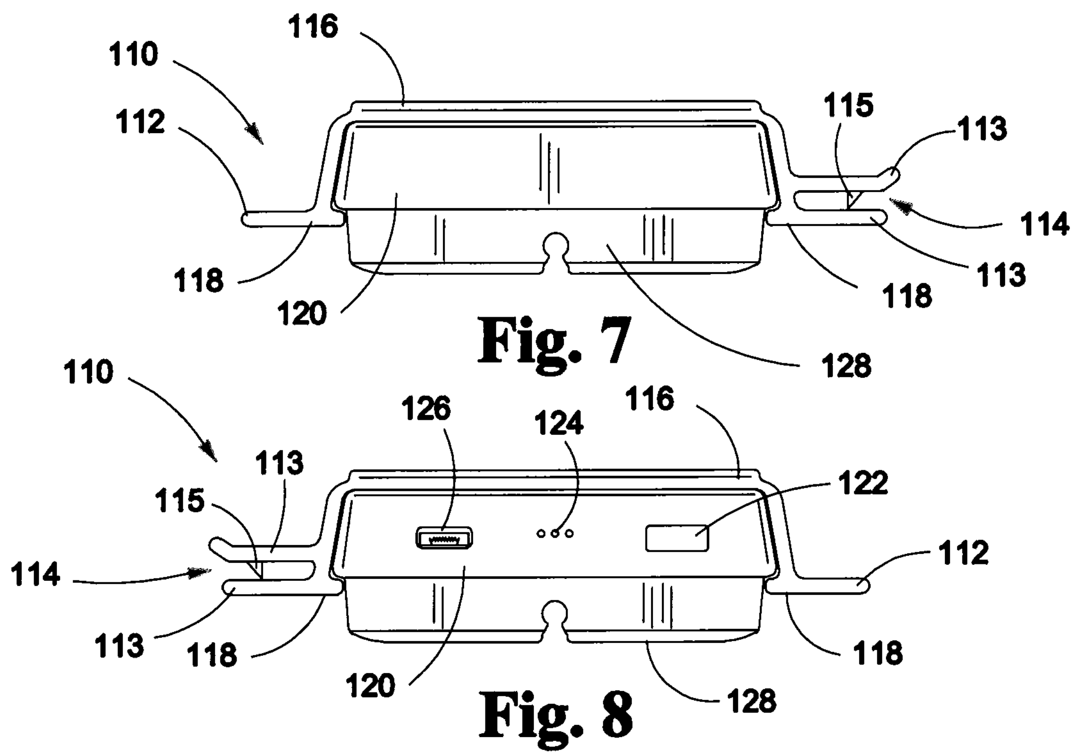
Fig. 7
Fig. 8
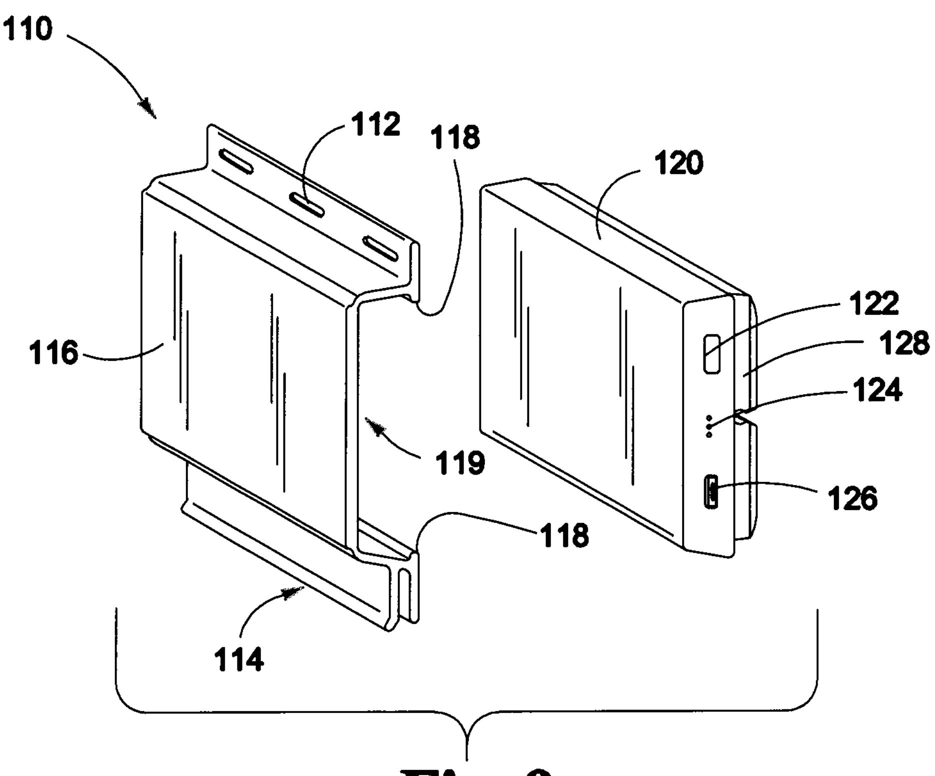
Fig. 9

812
814
822
803
808
150
802
102
100

MODULAR MULTI-FUNCTIONAL CONFERENCE WEARABLE SYSTEM

CROSS-REFERENCE TO RELATED APPLICATIONS

This application claims priority from U.S. Provisional Application Ser. No. 62/572,980, filed Oct. 16, 2017, and entitled MULTI-FUNCTIONAL RECHARGEABLE USB LANYARD. The contents of U.S. Provisional Application Ser. No. 62/572,980 is hereby incorporated, in its entirety, by reference.

FIELD OF THE INVENTION

The present invention generally relates to portable, rechargeable, multi-functional badges and lanyards. More specifically, the present invention relates to a portable charging system that may be configured and worn as a lanyard or other presentation methods. Additionally, the system connects with one or more battery modules to provide portable recharging and powering capabilities to connected electronic devices. Moreover, the connector on one end of the system of an embodiment is used as the coupling mechanism to hold or form the lanyard loop. The second connector may also be used with complimentary cases for portable electronic devices so that the device and/or battery may be transported on the lanyard and, thus, allowing hands free carrying of the device and/or battery as well as to receive and hold a printed or laminated name tag.

BACKGROUND

Portable electronic devices, such as media players, digital name tags, and smartphones, have become increasingly smaller, lighter, and more powerful. They are frequently carried around by people who are moving from place to place and/or performing physical activities, i.e. walking, running, cycling, stair climbing, etc. As the user moves, the portable electronic device can be held in the user's hand, worn by the user, or otherwise secured relative to the user's body. To free the user's hands, the user may prefer to secure the portable electronic device relative to their body. Due to the various types and configurations of portable electronic devices, it is difficult to design a device for securing various portable electronic devices relative to the various users. Furthermore, it is difficult to design a device for securing various portable electronic devices that holds the device securely, yet can easily and quickly be removed therefrom.

Rechargeable battery packs are used to power a wide variety of portable devices, particularly portable devices that are in frequent use and use a significant amount of power where the cost of using non-rechargeable batteries would be prohibitive. A rechargeable battery pack is a packaging of an electrochemical cell or cells, connectors, contacts, circuitry, and wiring, as well as the structural elements to support those elements and to allow the rechargeable battery pack to be connected or coupled to a device in order to power the device for use, typically by interfacing the device to be charged to the battery pack via a charging cable.

Many portable rechargeable battery packs are designed to be charged while attached to a device that is also powered by the portable rechargeable battery pack, as well as alone (not attached to a device). Accordingly, it is conventional for a portable rechargeable battery pack to have two sets of contacts: a set for providing power to the host device, and a set for charging the portable rechargeable battery pack while the portable rechargeable battery pack is attached to the host device. The set of contacts used to charge the portable rechargeable battery pack can be referred to as the charging connector. The charging connector can be exposed while the portable rechargeable battery pack is attached to a host device, which can further expose it to undesirable conditions, such as short circuiting across the positive and negative charging contacts.

There has been a continuing demand for portable devices, and hence the need for portable power. Accessories and other devices are presently available which do not need a conventional AC to DC adapter, but do not have their own power source. For example, there are a number of devices that can be powered from a computer, such as a laptop computer, via the universal serial bus (USB) of the computer. Additionally, current portable battery packs are bulky compared to accessories worn on a person every day. Moreover, current portable battery packs must be stored in a pocket, purse, or bag or held by the user. Furthermore, other lanyards may provide an embedded thumb drive or charging cable, but do not provide a modular system that allows a power source, charging cable, marketing holder, and/or name badge.

Accordingly, there is a need in the industry for a presentation system that allows a user to embed or connect a power source and charging cable to a lanyard along with a name badge. Additionally, the desired device should allow the user to selectively utilize or detach portions of the system to streamline the weight of the device if certain aspects are unnecessary for a particular use. Moreover, the system provides an integrating case that provides a marketing area for a sponsor or event identification. Other objects and advantages of the invention will be apparent from the drawings and detailed description to follow.

SUMMARY

The present invention provides a novel charging system that can be configured and worn as a lanyard and includes a modular battery pack which reduces and/or eliminates the above-identified draw-backs. The device of the present invention includes a modular system comprising a battery case that includes attachment points for a lanyard, name badge, marketing/endorsement area, and a battery pack. The battery pack is contemplated to be of a complimentary design to interface with and be contained by the battery case. Moreover, the lanyard may comprise of two male connectors which are connected by one or more lengths of wire to form a conductive cable. One of the two male connectors interfaces with a complimentary female receptacle in the modular battery unit while the other male connector can be connected to the device to be charged. In an alternative embodiment of the system, the charging cable may be separate from the lanyard and may be carried in an opening attached to the battery pack or otherwise integrated with the battery pack. Each of the male connectors of either iteration of the charging cable can be of various connection types to allow connections to various electronic devices and/or power sources.

For example, the preferred embodiment includes a micro-USB male connector on the first male connector end and a standard male USB-A connector on the second male connector end. This would allow the device to be used to connect a cellphone or other compatible electronic device that uses a micro-USB connector to receive power and transfer data to connect through the cable to a power source connected to the standard USB-A connector on the second end. Also contemplated is the inclusion of a control panel on the modular battery unit that includes a power button to control power flow from the internal battery and/or at least one LED to indicate the charge level within the battery unit. Contemplated as adjacent to the control panel is the aforementioned female connector that complements with and securely connects with the second male connector. While the conductive wire would only need to be sheathed in an insulating material to make it useful and safe for users, the preferred embodiment of the present invention utilizes a fabric, leather, or other similar materials to surround the wires of the device. Additionally, each modular battery unit of the preferred embodiment includes a second female USB receptacle to allow a user to charge a second device simultaneously or connect another power source, such as a power brick or another battery unit, to further enhance the power capabilities of the modular battery unit.

It is contemplated that the present invention can include other modular attachments to the system. For example, contemplated is a modular key ring attachment that removably connect with an end of the charging cable integrated into the lanyard of the present invention and/or the battery case. Additional modular attachments can include name badges, wall chargers, phone cases, speakers, wallets, etc.

Looking specifically to the battery module, also contemplated is one or more LEDs integrated into the control panel to show the charge status of the electronic device connected to the cable and/or the power/charge status of the internal battery. The modular attachments of the preferred embodiment of the modular battery module of the present invention is via the complimentarily designed interfaces with the battery case and/or a USB connector located on an end of the included charging cable. However, alternative embodiments of the present invention also include one or more magnets on the first and second connector ends to provide additional stability and strength to the connection between the module and the lanyard of the present invention. Other embodiments of the present invention include other supplemental connectors such as, Velcro®, prongs, snaps, etc.

In an embodiment of the present invention, the one or more magnets on the second connector end of the preferred embodiment interface with oppositely charged magnets integrated in the female connector end on the module to be connected. It is anticipated additional modules can be daisy chained with one another if so desired. Another embodiment utilizes complimentary mechanical connections adjacent to the second connector end to create secure connections with complimentary receiving designs integrated with modules to be connected via the female connector of the device.

The device of the present invention allows a user to more easily carry and charge one or more portable electronic devices as well as additional accessories such as keys, speakers, etc. Also, while the user is wearing the device, he/she will always have a charging cable for one or more portable electronic devices on their person. Furthermore, since the device includes a modular battery pack, a user would be able to charge their electronic devices while traveling without resorting to hunting down external power sources. Additionally, if a modular battery pack fails or is discharged, the user may swap in another modular battery pack with very little effort. Moreover, the device can be worn as a smart name badge if it is connected to a name badge or small portable screen device and worn in its lanyard configuration. Because the device of the present invention includes a modular battery power source and can include a method to securely connect to a portable electronic device, the invention can secure a portable electronic device while being worn as a lanyard without fear as to whether the portable electronic device will fall from the device of the present invention.

BRIEF DESCRIPTION OF THE DRAWINGS

FIG. 7 is a side elevation view of the preferred embodiment of a modular multi-functional conference wearable system of the present invention.

FIG. 8 is a side elevation view, opposite to the elevation show in FIG. 7, illustrating the modular battery control panel of the preferred embodiment of a modular multi-functional conference wearable system of the present invention.

FIG. 9 is a perspective view of the battery case and modular battery of the preferred embodiment of a modular multi-functional conference wearable system of the present invention.

DETAILED DESCRIPTION

Figure 1:
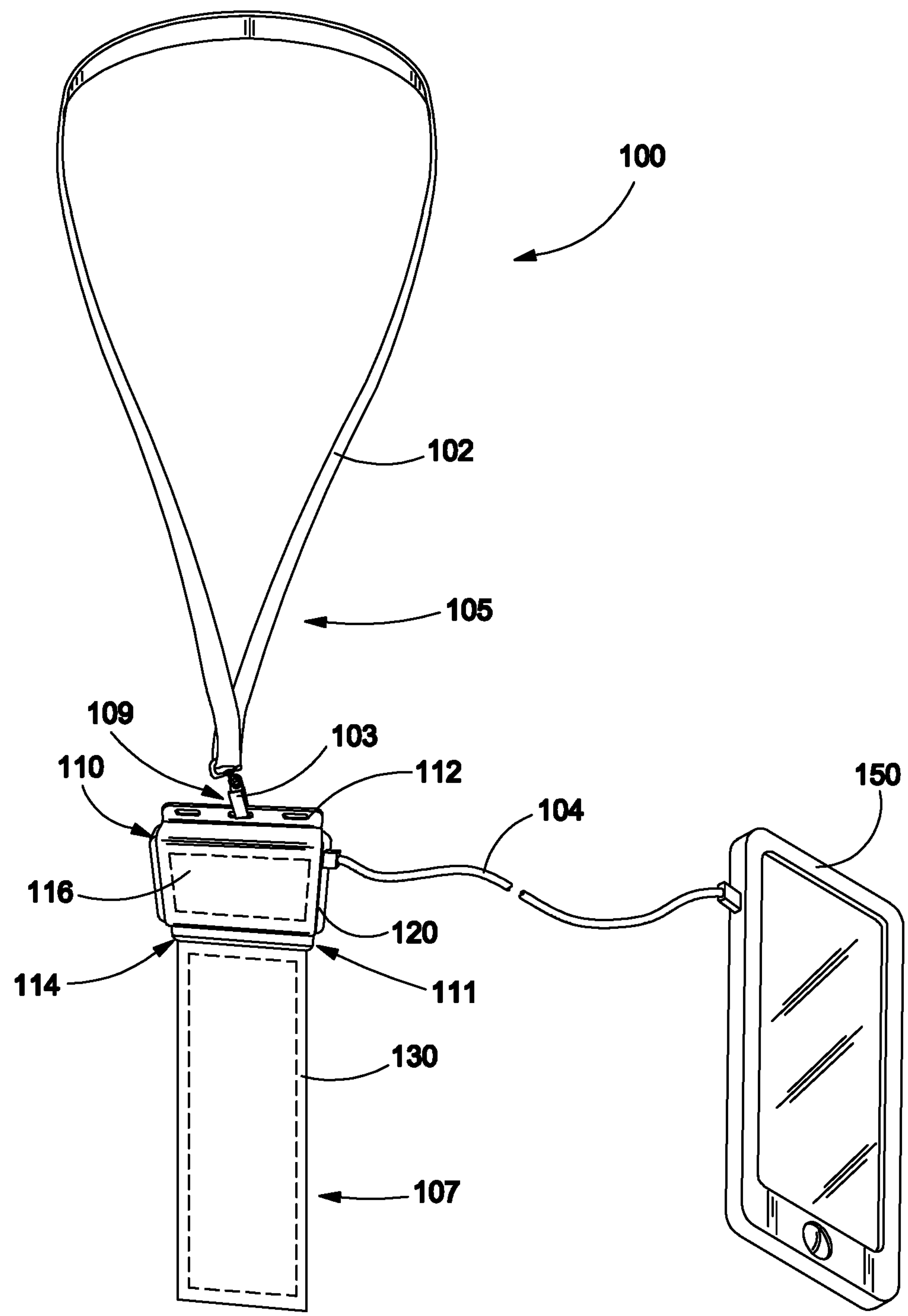
FIG. 1 is a perspective view of the preferred embodiment of a modular multi-functional conference wearable system of the present invention.

The following is a detailed description of a system 100 for a modular multi-functional conference wearable (sometimes "system" or "apparatus"). One particular use of such an apparatus 100 is to recharge or power one or more electronic devices and display a user's name and/or affiliation during a conference or networking event. Additionally, the apparatus 100 may also be used for data transfer between two electronic devices. For ease of discussion and understanding, the following detailed description may refer to the apparatus as a conference wearable system, system, device, badge system, case, cable system, lanyard, charging cable, charging lanyard, charging cable with battery, and/or a lanyard with power. However, it will be appreciated by one skilled in the art that an apparatus 100 of the present invention may be used in any number of circumstances, including, but not limited to, vacation charging apparatus, private use apparatus, exercise apparatus, and/or college campus apparatus, and can be used for any number of charging activities including, but not limited to, secure and transport a portable electronic device, charge a portable electronic device from an external power source, charge a portable electronic device from an attached power source, and/or charge a portable electronic device using an external power source while also charging an attached power source.

The system 100 of the present invention is of benefit anywhere and to anyone where hands-free charging and/or carrying of one or more electronic devices is advantageous. More specifically, during conference and networking events it is desirable to carry as little as possible in your hands so that a user may mingle with other people as well as participate in the conference. However, given the reliance we now place on our portable electronic devices, especially devices such as smart phones and tablets, it is all but necessary to have such devices available and usable at a moment's notice. One of the primary limitations of modern portable electronics is their battery life and, thus, their ability to stay powered on through a day or more of heavy use. Accordingly, people often carry traditional portable battery banks with them to charge their devices without needing to plug the phone into an outlet. Carrying a mobile electronic device/phone along with a traditional battery bank can overload a user's pockets or require the user to carry the traditional battery bank in hand so that it does not overheat in their pocket during use. This is an especially disadvantageous during conferences and networking events as discussed above.

The device of the present invention solves this problem by providing an open air, yet hands-free method of carrying a portable battery to charge one or more electronic devices. Moreover, as will become from this detailed description below, and in light of the accompanying figures, the system 100 provides modularity to a user's specific needs while providing a single solution to house a name badge 130, battery module 120, a lanyard 102, electronics cable 104, key ring 822, electronic device 128, and/or additional modules in a single unit connected via a battery case 110 worn around a user's neck rather than in a pocket where a battery or electronic device may overheat. The system 100 also allows other attachment methods from the preferred embodiment that utilizes a lanyard 102 that makes the system 100 more closely attached to a user's body for uses such as during exercise or other vigorous activities.

Referring to FIG. 1, the system 100 of the present invention is shown. The system 100 includes a number of modular components that may interface with another to produce the system 100 of the present invention. The system includes a battery case module 110, a first module 105, and a second module 107. A first mechanical connector 109 and a second mechanical connector 111 are also included to connect the various modules. More specifically, the preferred embodiment of the present invention comprises a lanyard 102 removably connected via a lanyard attachment mechanism 103 to a battery case module 110. The battery case module 110 includes a lanyard receiving mechanism 112 that is complimentarily designed to the lanyard attachment mechanism 103. The preferred embodiment of the present invention utilizes a clip 103 attached to the bottom of the lanyard 102 to clip to a complimentary shaped attachment opening 112 on the battery case module 110. However, it should be appreciated by one skilled in the art that any lanyard attachment mechanism 103 and complimentarily designed lanyard receiving mechanism 112 of the battery case module 110, now known or developed in the future, may be utilized without departing from the scope of the present invention.

Figure 5:
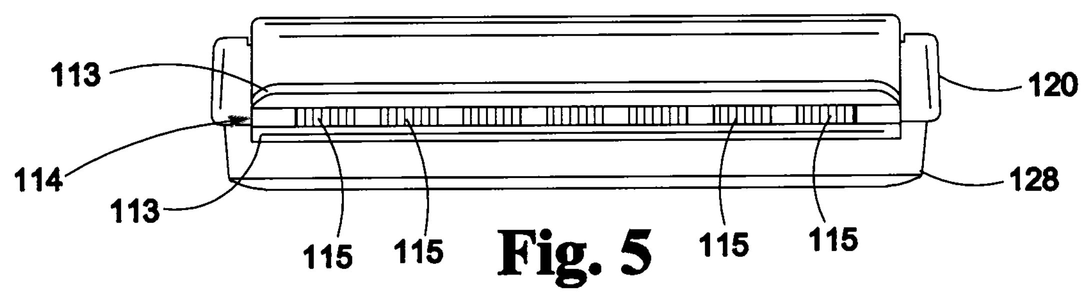
FIG. 5 is a bottom elevation view of the preferred embodiment of a modular multi-functional conference wearable system of the present invention.

The battery case module 110 of the preferred embodiment illustrated in FIG. 1 further comprises a display area 116 at the front of the module 110. It is contemplated the display area 116 may be a small LCD screen or, more simply, a blank, substantially flat area on which a user may write, paint, or apply additional information to (via a decal or sticker). The display or display area 116 can be utilized for advertising or to indicate endorsement of the conference where the system 100 is being utilized. It is further contemplated that the small LCD screen display 116 is powered via the battery bank 120 of the system 100. It should be appreciated by one skilled in the art that any electronic display technology, whether now known or utilized in the future, including, but not limited to, OLED, LED, and/or foldable display technology or informational display method may be utilized without departing from the scope of the present invention. The battery case module 110 of the preferred embodiment illustrated in FIG. 1 also comprises a lower retention mechanism 114 which is contemplated as capable of holding a name badge or informational placard 130. The lower retention mechanism 114 of the preferred embodiment comprises a channel made up of two side walls 113 with a predetermined space between each wall 113 with flexible or semi-flexible members or teeth 115 traversing the channel opening at one or more intervals (as illustrated in FIGS. 5, 7, and 8). However, it should be appreciated by one skilled in the art that any retention mechanism 114 may be utilized and any component 130 of sufficient size to interface with the lower retention mechanism 114 of the battery case module 110 may be utilized without departing from the scope of the present invention.

Figure 2:
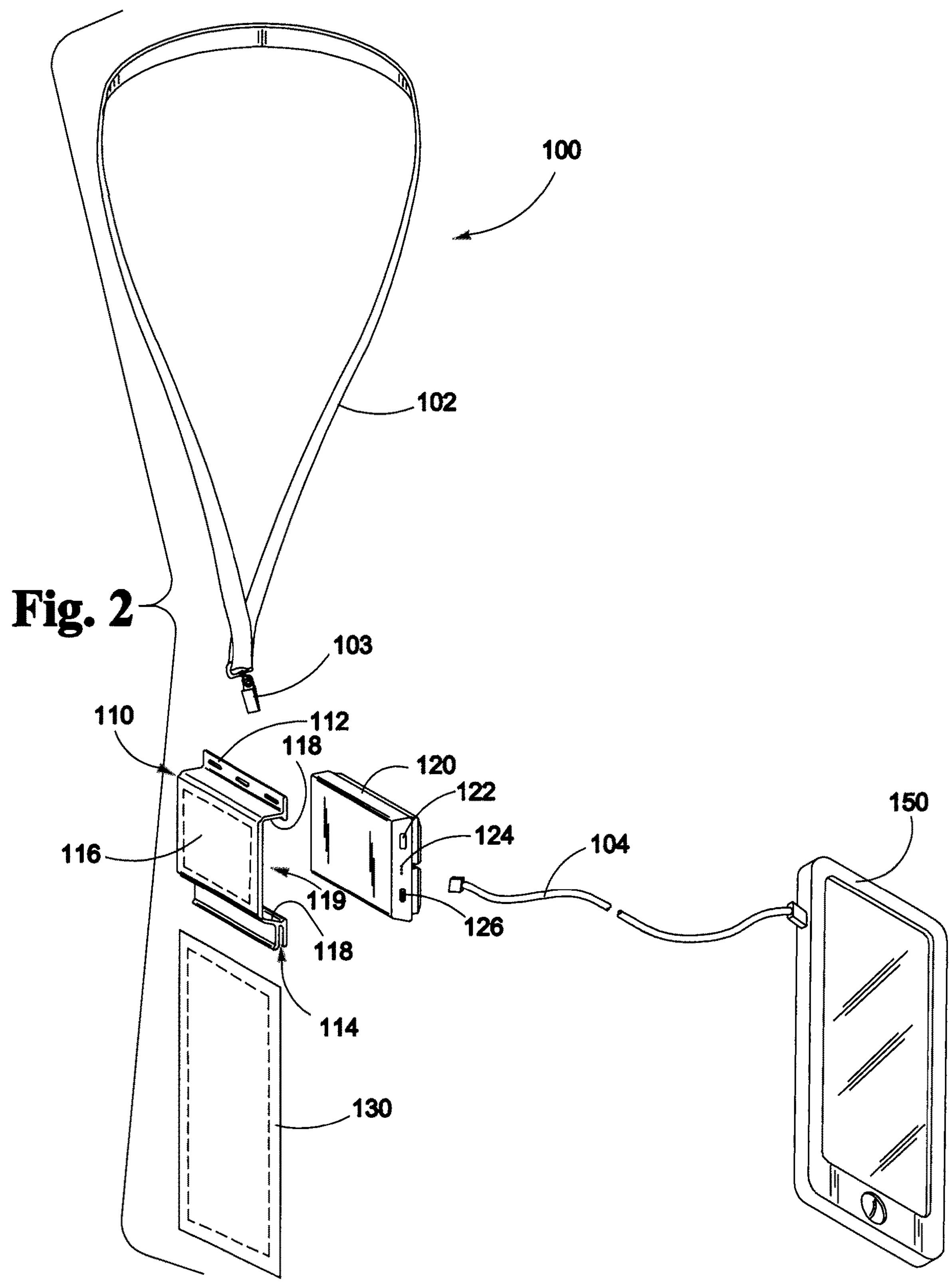
FIG. 2 is an exploded view of the preferred embodiment of a modular multi-functional conference wearable system of the present invention.

Looking to FIG. 2, provided is the preferred embodiment of the system 100 of the present invention. As discussed above, the battery case module 110 includes an attachment point for a lanyard 102, such as a clip 103 at the end of a lanyard 102, along with a lower retention mechanism 114 for a name badge 130 and a display area 116. The battery case module 110 of the present invention also comprises one or more battery retention mechanisms 118. The preferred embodiment of the present invention utilizes semi-flexible case material, such as plastic, along with inwardly directed protrusions 118 along the lower and upper edges of the rear opening 119 of the battery case module 110 that allow a user to slightly deform the case to insert a battery module 120 into the battery case module 110 that retains the battery module 120 when the user releases the case 110 and it returns to its original shape. The battery case module 110 battery retention mechanism 118 of the preferred embodiment utilizes compression and/or static friction forces to hold the battery module 120 within the system 100. It is further contemplated that the shape of the battery module 120 is complimentary to the opening 119 in the battery case module 110 in which the battery 120 will be seated. The battery module 120 of the preferred embodiment is contemplated as rectangular in shape. However, it should be appreciated by one skilled in the art that any battery retention mechanism 118 of sufficient size and strength to hold the battery even during vigorous movement by the user and shape of the battery module 120 may be utilized without departing from the scope of the present invention. During use, a user inserts one end of a cable 104, such as a USB charging cable, into a port 126 on the battery module 120 and the other end of the cable 104 into an electronic device 150 so that it may be charged by the battery module 120. Moreover, the user may choose to turn the battery module 120 on or off via the power button 122 so that the electronic device 150 does not need to be disconnected from the apparatus 100 to stop charging. Additionally, the preferred embodiment of the present invention utilizes one or more LEDs 124 to indicate the charge status of the battery module 120. However, it should be appreciated by one skilled in the art that a battery module 120 with any type of charge indicator 124 or no charge indicator 124 as well as with or without a user operated power mechanism 122 may be utilized without departing from the scope of the present invention.

Figure 3:
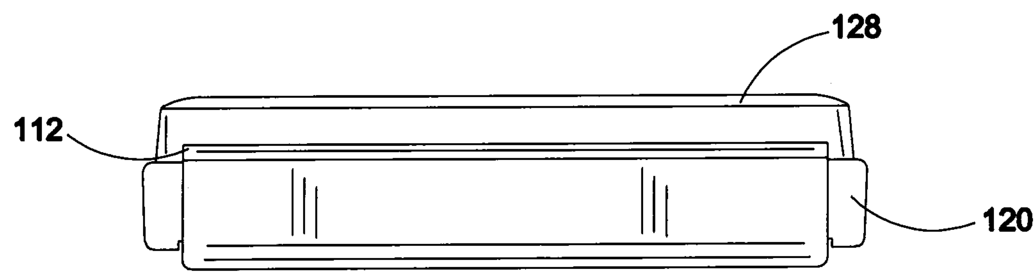
FIG. 3 is a top elevation view of the preferred embodiment of a modular multi-functional conference wearable system of the present invention.
Figure 4:
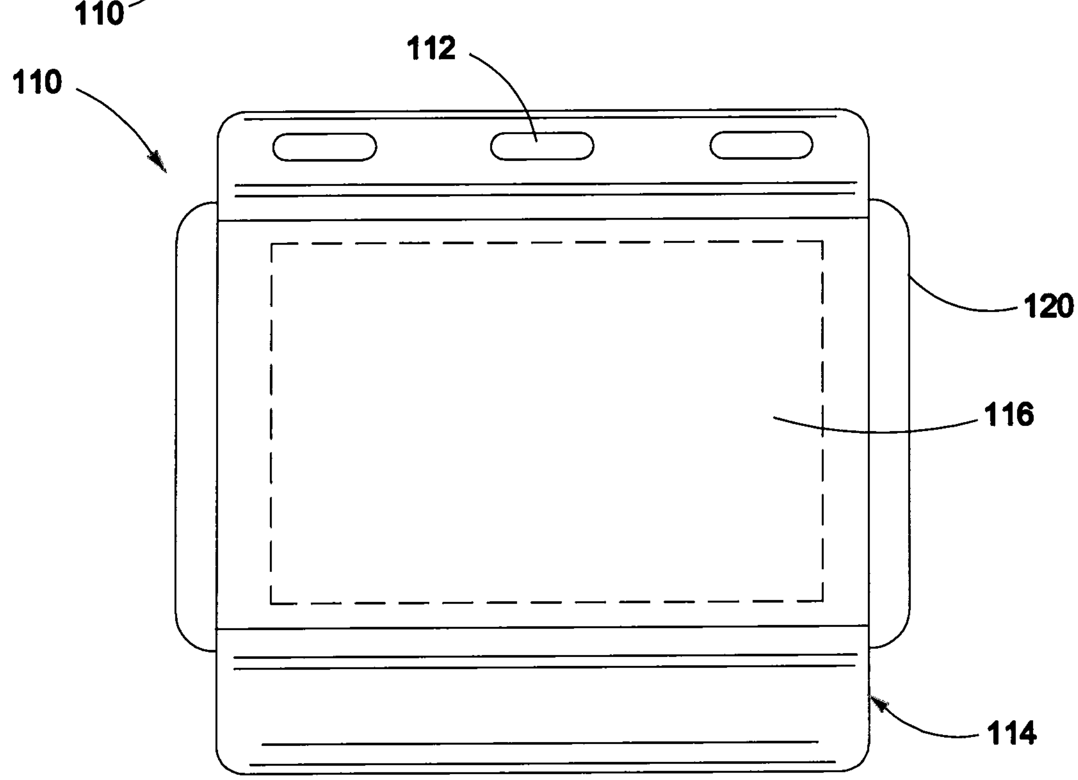
FIG. 4 is a front elevation view of the preferred embodiment of a modular multi-functional conference wearable system of the present invention.

Referring to FIG. 3-5, provided are top-down, front, and bottom-up views, respectively, of the preferred embodiment of the present invention. FIG. 3 provides a top-down view of the battery case module 110 and battery module 120 of the preferred embodiment. More specifically, provided is the cable and/or device holder 128 integrally formed with the rear of the battery module 120 of the preferred embodiment. However, it should be appreciated by one of ordinary skill in the art that other configurations for the cable and/or device holder 128, such as an elastic band that is connected to the battery module 120 (See FIGS. 10A and 10B), without departing from the scope of the present invention. FIG. 4 provides a close-up of the display area 116 of the battery case module 110 with the battery module 120 attached. Looking to FIG. 5, provided is a bottom-up view of the battery case module 110 with a battery module 120 installed. More specifically, FIG. 5 provides a detailed view of the lower retention mechanism 114 channel comprised of two side walls 113 spaced apart from one another and the flexible members or teeth 115 that are integrally formed with one side wall and traverse the opening or channel between the two side walls 113 to be proximally located to the opposing side wall 113 from the side wall 113 the teeth 115 originate from. Accordingly, a name badge or placard 130 is slid into the lower retention mechanism's 114 channel and the name badge 130 interfaces with at least one side wall 113 of the channel as well as the flexible teeth which hold the name badge 130 in place using compression and/or static friction forces. Again, it should be appreciated by one skilled in the art that any lower retention mechanism design that is sufficient to hold a name badge 130 or other desired module can be utilized without departing from the scope of the present invention.

Figure 6A:
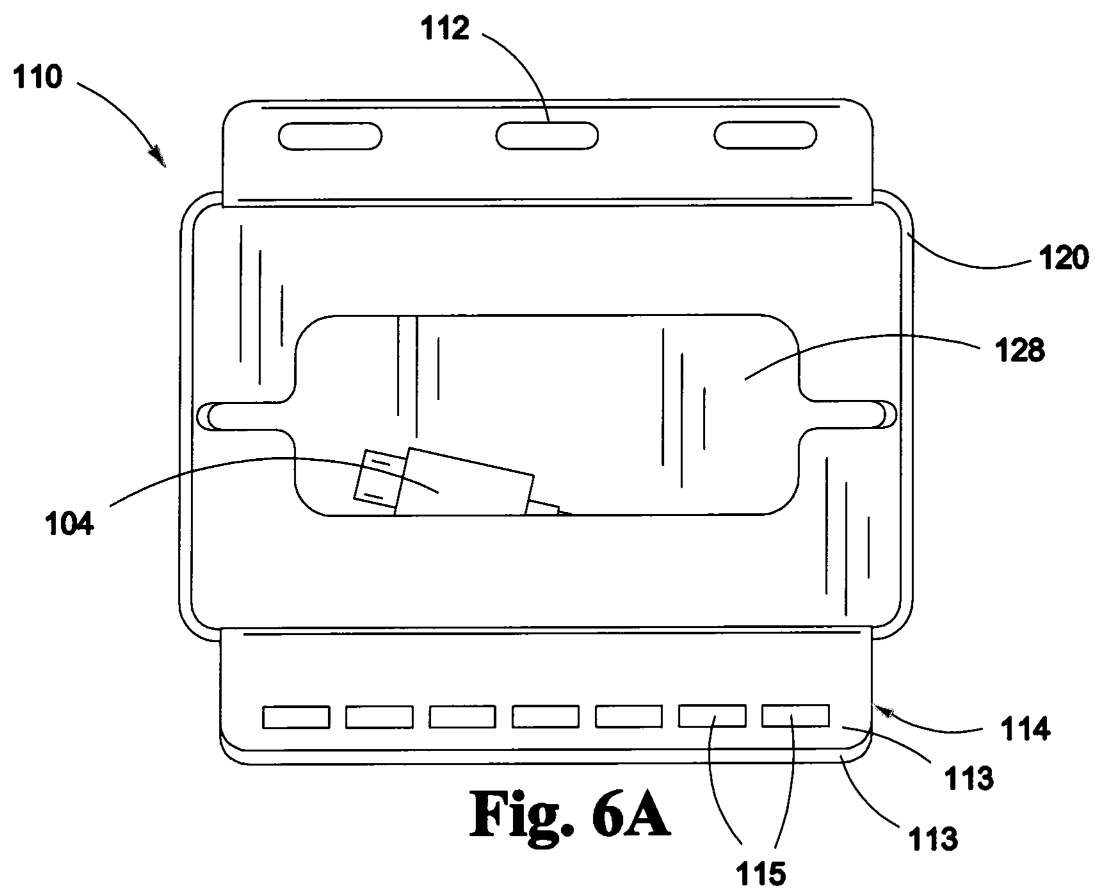
FIG. 6A is a rear elevation view of the preferred embodiment of a modular multi-functional conference wearable system of the present invention.
Figure 6B:
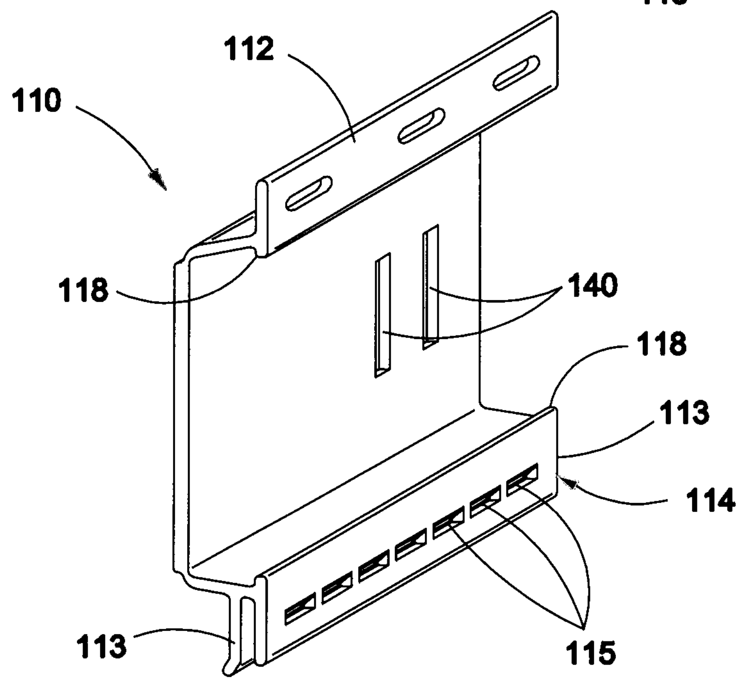
FIG. 6B is a rear elevation view of the preferred embodiment of the battery case module of a modular multi-functional conference wearable system of the present invention.

Looking to FIGS. 6A, 6B, 7, and 8, provided are rear and side views of the preferred embodiment of the modular system 100 of the present invention. FIG. 6A illustrates the cable and/or electronic device holder 128 integrally formed with the rear of the battery module 120 in the preferred embodiment of the system 100. FIG. 6B illustrates the rear of the battery case module 110 without a battery module 120 installed. As shown, in FIG. 6B, the rear surface of the battery case module 110 of the preferred embodiment of the system 100 includes one or more slots, preferably two, perpendicular to the top and bottom planes of the battery case module 110 sized to receive an identification card or credit, debit, or other bank or entity issued card. It should be appreciated by one skilled in the art that any number, size, or orientation of slots can be integrated into the rear surface of the battery case module 110 as desired without departing from the scope of the present invention. The cable/device holder 128 ideally includes an opening sufficient to allow a user to insert a cable and/or device into the storage area while still securing same by overlapping a sufficient portion of the cable and/or device within the storage area. Additionally, as shown in FIG. 7, the cable/device holder 128 of the preferred embodiment includes one or more slits on either side of the opening of the holder 128 that create a small opening on at least one side of the cable/device holder 128. This is contemplated to allow a cable 104, such as a USB charging cable, to sit within the opening and slit when one end of the cable 104 is plugged into the battery module 120 and the other end is connected to the electronic device 150, to aid in the retention of same, stored within the cable/device holder 128 of the present invention. However, it should be appreciated by one of ordinary skill in the art that any configuration of a cable/device holder 128 may be utilized, such as the elastic band cable/device holder 128 illustrated in FIGS. 10A and 10B and discussed below, without departing form the scope of the present invention.

Referring now to FIG. 8, provided is a side view of the preferred embodiment of the system 100 of the present invention. Specifically shown is the preferred embodiment of the user interface of the battery module 120. Provided is a power toggle mechanism 122 that allows a user to turn the unit on or off to start or stop, respectively, the charging of a device 150 from the battery module 120. As such, this reduces the need of a user to physically disconnect the electronic device 150 from the battery module 120, reducing wear to the electronic device 150 and the battery module charging port 126. The preferred embodiment of the system 100 of the present invention provides a USB-A port to connect a mobile phone charging cable 104 to the battery module 120. However, it should be appreciated by one skilled in the art that any type of charging port may be utilized, such as a Lightning® port, Thunderbolt® port, USB-C port, micro-USB port, mini-USB port, etc., without departing from the scope of the present invention.

Turning to FIG. 9, provided is a close-up exploded view of the battery case module 110 and battery module 120 of the preferred embodiment of the present invention. Here, again, is provided the complimentary shape of the battery module 120 to the battery case module's 110 opening 119 to receive the battery module 120. Additionally, the battery module 120 includes a control panel as discussed above and further includes one or more LEDs 124 to indicate to a user the charge level of the battery module 120 in the control panel of the battery module 120. Accordingly, a user will know the status of the battery module 120 at a glance. However, it should be appreciated by one skilled in the art that any charge indicator 124 may be utilized without departing from the scope of the present invention. Moreover, it should be appreciated by one skilled in the art that a battery module 120 without a charge indicator 124 and/or manual power toggling mechanism 122 may be utilized without departing from the scope of the present invention.

Figure 10B:
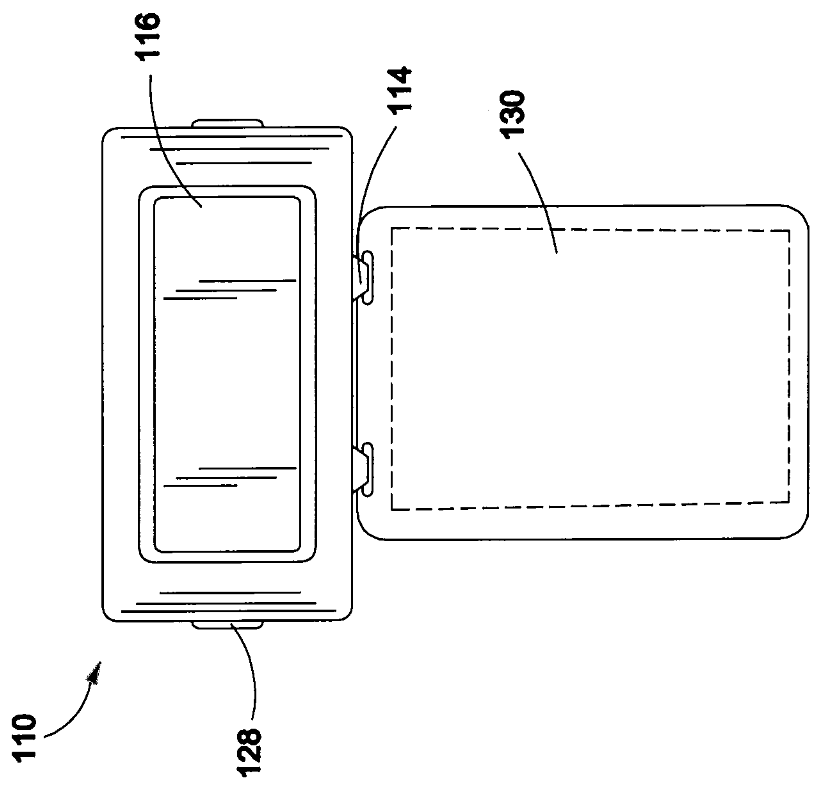
FIG. 10B is a front elevation view of the first alternative embodiment of a modular multi-functional conference wearable system of the present invention.
Figure 10A:
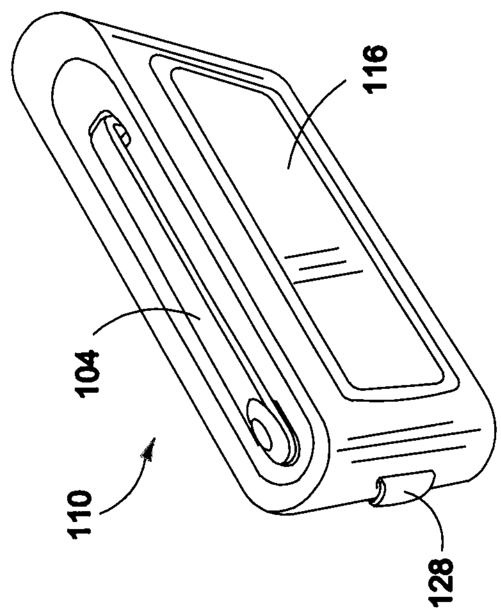
FIG. 10A is a perspective view of a first alternative embodiment of a modular multi-functional conference wearable system of the present invention.

Looking now to FIGS. 10A and 10B, provided is a first alternative embodiment of the system 100 of the present invention. As shown in FIG. 10A, in this first alternative embodiment, the electronic charging cable 104 is integrated with the battery case 110 and the battery case 110 includes an internal battery rather than a modular battery. In this embodiment, one end of the charging cable 104 is integrated with the battery 120, while the other end is connected via a cable 104 protruding from the battery case 110 and designed to sit within the case 110 when not in use. This alternative embodiment also provides a display screen, powered by the internal battery 120, or area 116 at the front of the device and includes an elastic band as a lanyard receiving mechanism 112 and cable and/or device storage 128. The lanyard 102 slides between the battery case 110 and the interior side of the cable/device storage 128. The lanyard may also be connected to a name badge 130 as provided in FIG. 10B.

Figure 11B:
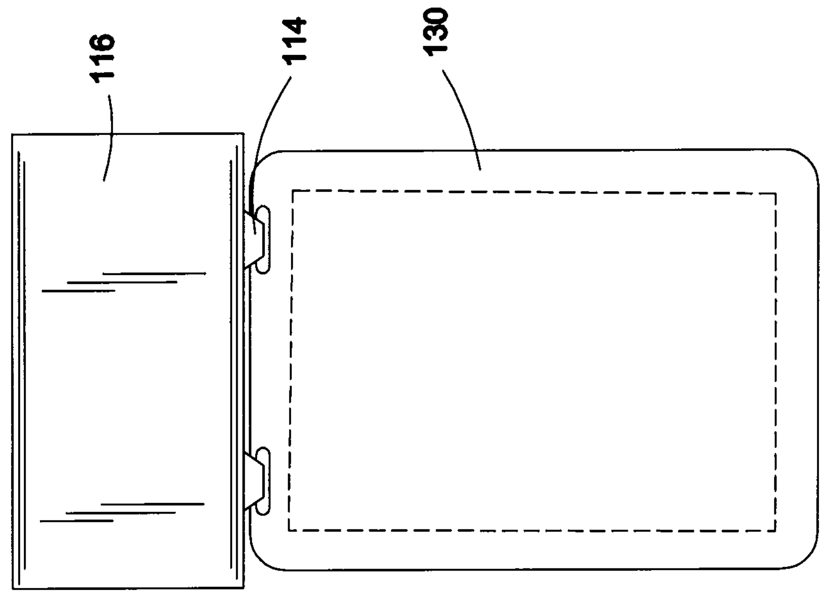
FIG. 11B is a front elevation of the second alternative embodiment of a modular multi-functional conference wearable system of the present invention.
Figure 11A:
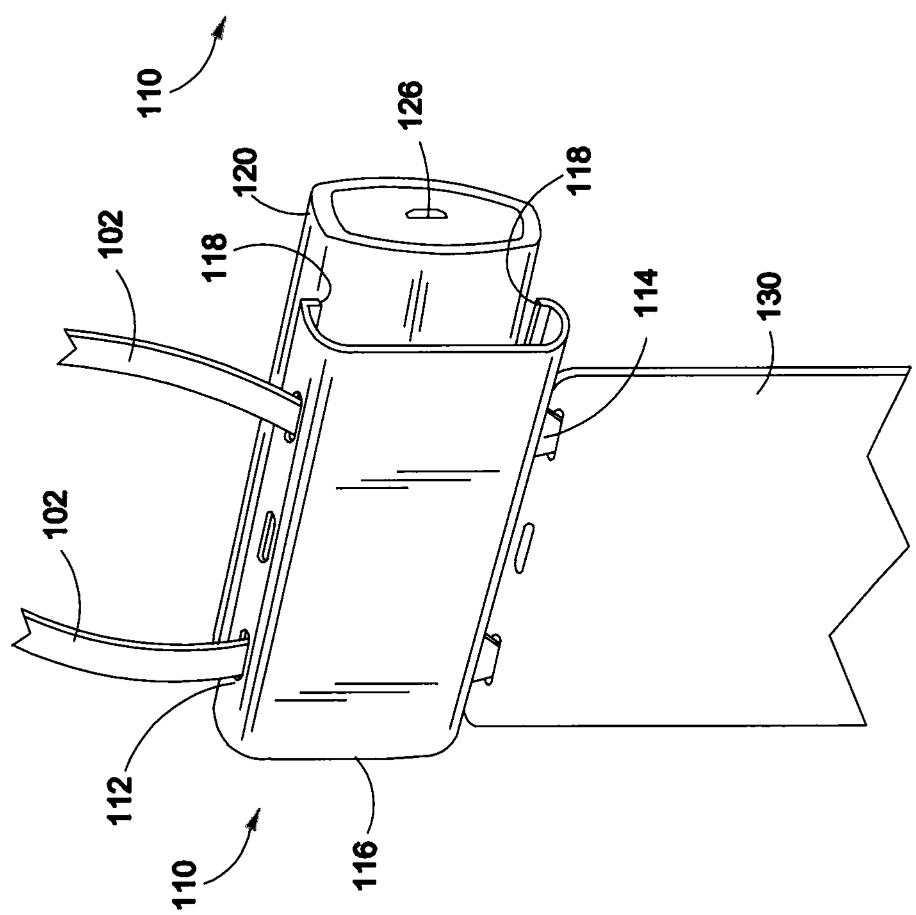
FIG. 11A is a perspective view of a second alternative embodiment of a modular multi-functional conference wearable system of the present invention.

Referring now to FIGS. 11A and 11B, provided is a second alternative embodiment of the system 100 of the present invention. As illustrated, the battery case module 110 of the second alternative embodiment includes a pass-through connector 112 and 114 to interface with and releasably hold a lanyard 102 or other body retention means with the rest of the apparatus 100. It is further contemplated the lanyard 102 of the second alternative embodiment is directly interfaced with a name badge 130 rather than through the battery case module 110 as provided in the preferred embodiment of the present invention.

Figure 12B:
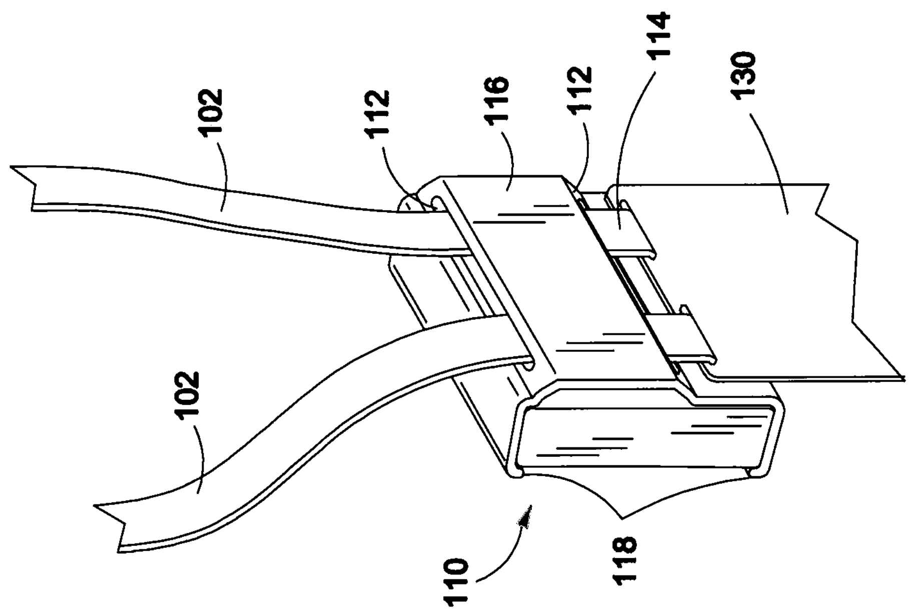
FIG. 12B is a perspective view of the third alternative embodiment of a modular multi-functional conference wearable system of the present invention.
Figure 12A:
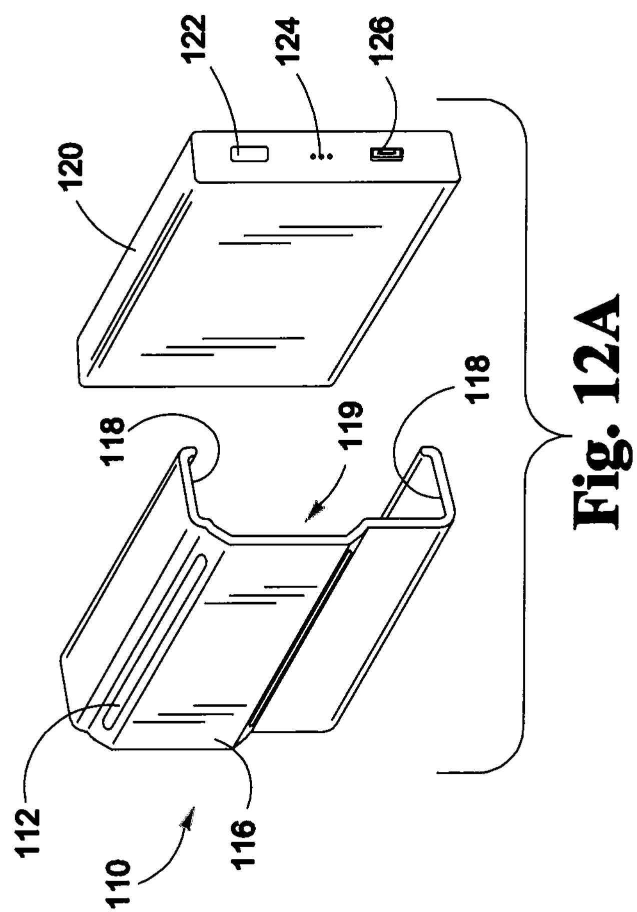
FIG. 12A is an exploded view of a third alternative embodiment of a modular multi-functional conference wearable system of the present invention.

Similarly, FIGS. 12A and 12B provide a battery case module 110 of a third alternative embodiment of the system 100 with an outcropping to extend the display area 116 away from the battery module 120 by providing a larger than necessary battery module opening 119 in the battery case module 110 and further allows a pass-through lanyard connection means 112. This additional space in the battery opening 119 of the battery case module 110 may aid in keeping the battery module 120 cool during use. The lanyard connector 112 of this embodiment allows a user to slide a lanyard through the lanyard connection slits 112 while the name badge 130 attached to the lanyard 102 helps retain the battery case module 110 and battery module 120 to the lanyard 102 traveling through the lanyard connection slits 112.

Figure 13:
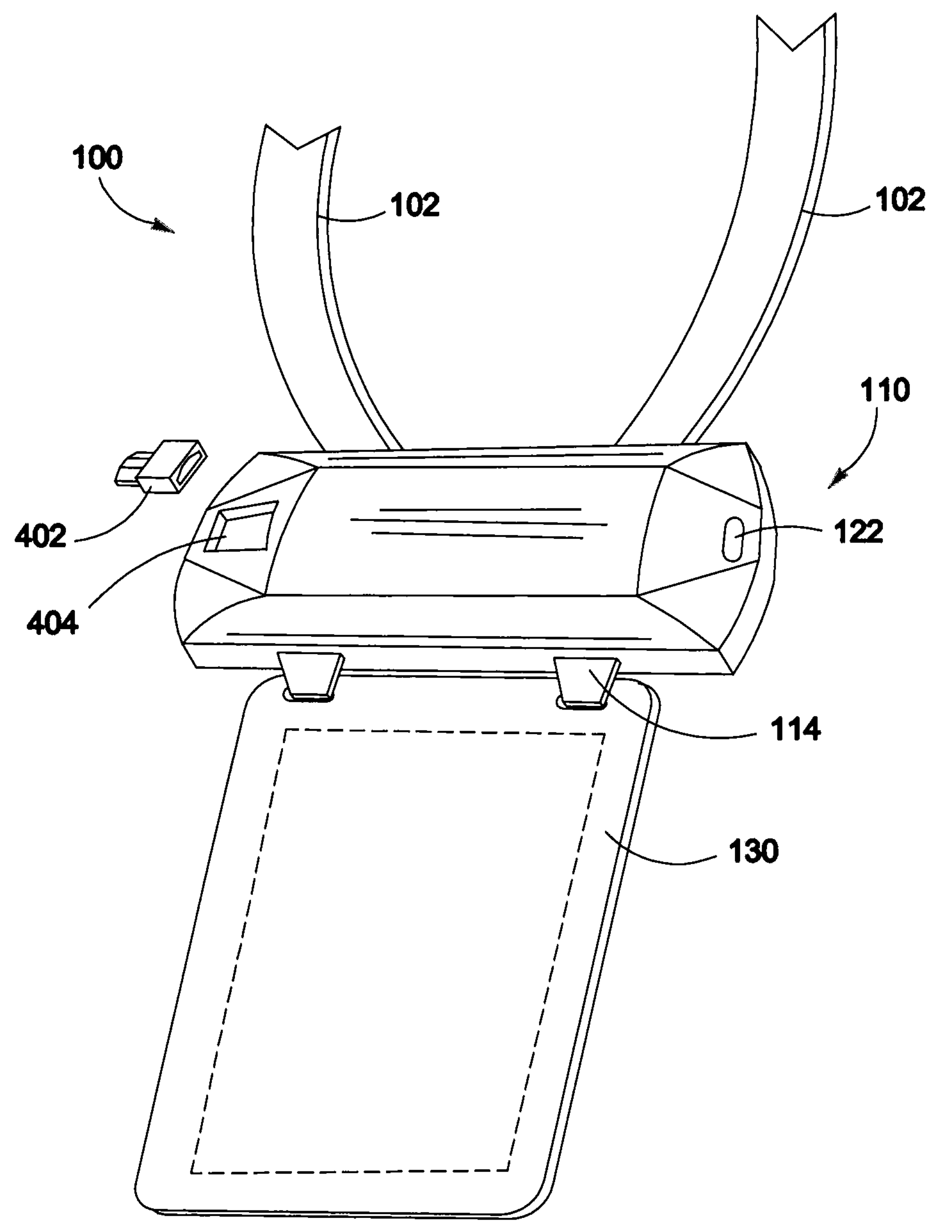
FIG. 13 is a perspective view of a fourth alternative embodiment of a modular multi-functional conference wearable system of the present invention.

Additionally, as shown in FIG. 13, it is contemplated the battery case module 110 of a fourth alternative embodiment of the system 100 of the present invention may also include one or more openings 404 to releasably receive and store one or more adapters 402 for use with the charging cable 104. This will extend the usage of the apparatus 100 since it will allow the charging cable to interface with more electronic devices 150 without a need to switch out or find an alternative charging cable 104. This is especially advantageous in embodiments where the charging cable 104 is integrated to the battery module 120, such as the embodiment depicted in FIGS. 10A and 10B.

Figure 14:
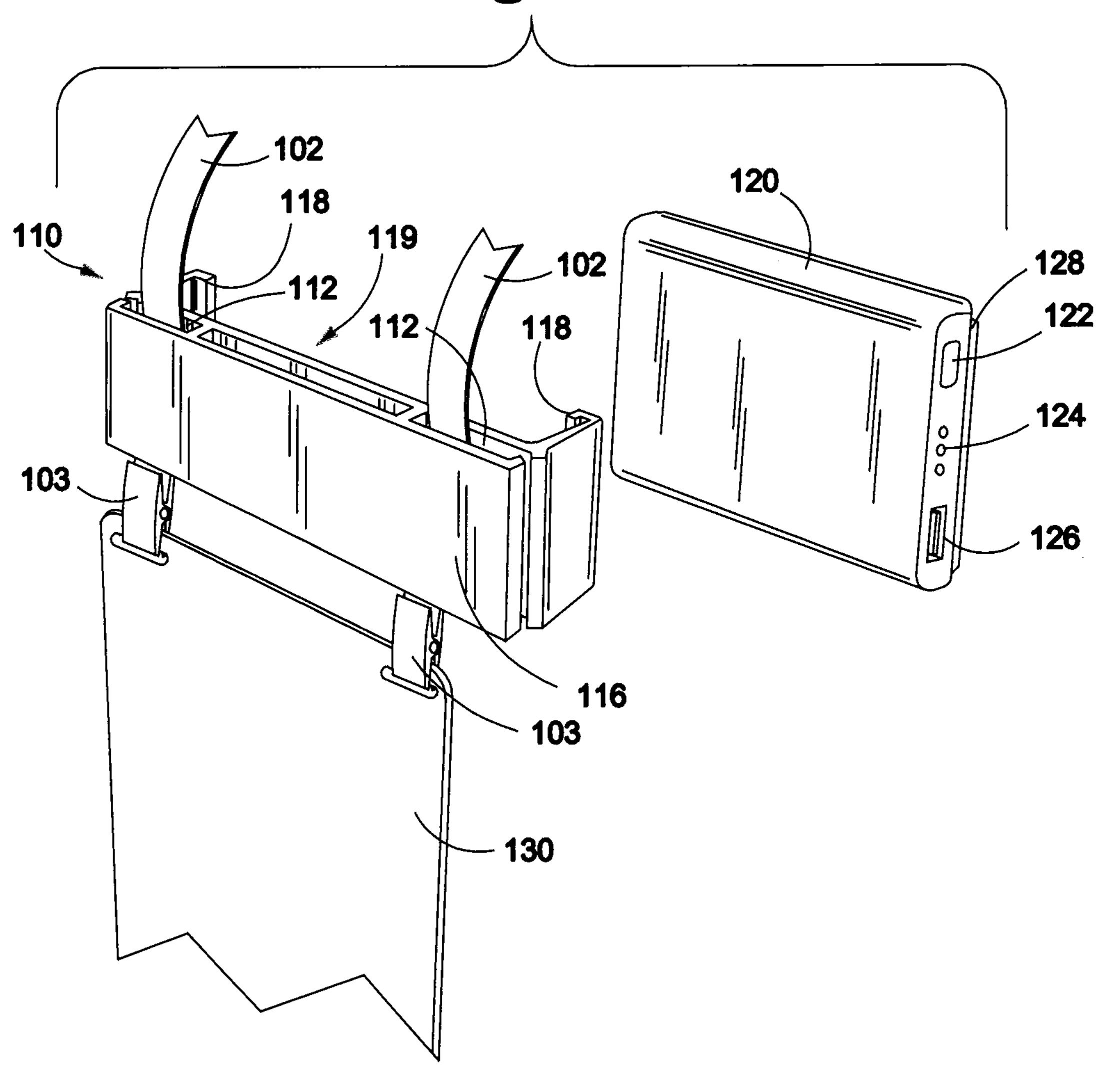
FIG. 14 is a perspective view of a fifth alternative embodiment of a modular multi-functional conference wearable system of the present invention.

Referring now to FIG. 14, provided is a fifth alternative embodiment of the system 100 of the present invention. This alternative embodiment provides a minimal battery case module 110 to provide greater exposed surface area of the battery module 120. As shown, this minimizes the display area 116 of the system 100. Additionally, this alternative embodiment utilizes clip retainers 112, similar to the retention mechanism 118 of the battery module 120, to retain the straps of a lanyard 102. In this embodiment, the lanyard 102 directly connects with a name badge 130 or other module via two lanyard clips 103. It is contemplated the battery opening 119 provided at the rear of the battery case module 110 includes battery retention mechanisms 118 that are slightly longer than in other embodiments to require a user to deform the case 110 further to fit the battery module 120 in the battery case module 110. This is contemplated since the smaller connection surface area will require a stronger hold on the battery module 120 to keep it from coming loose and falling away from the apparatus 100 during use, compared to other embodiments discussed above.

Figure 15:
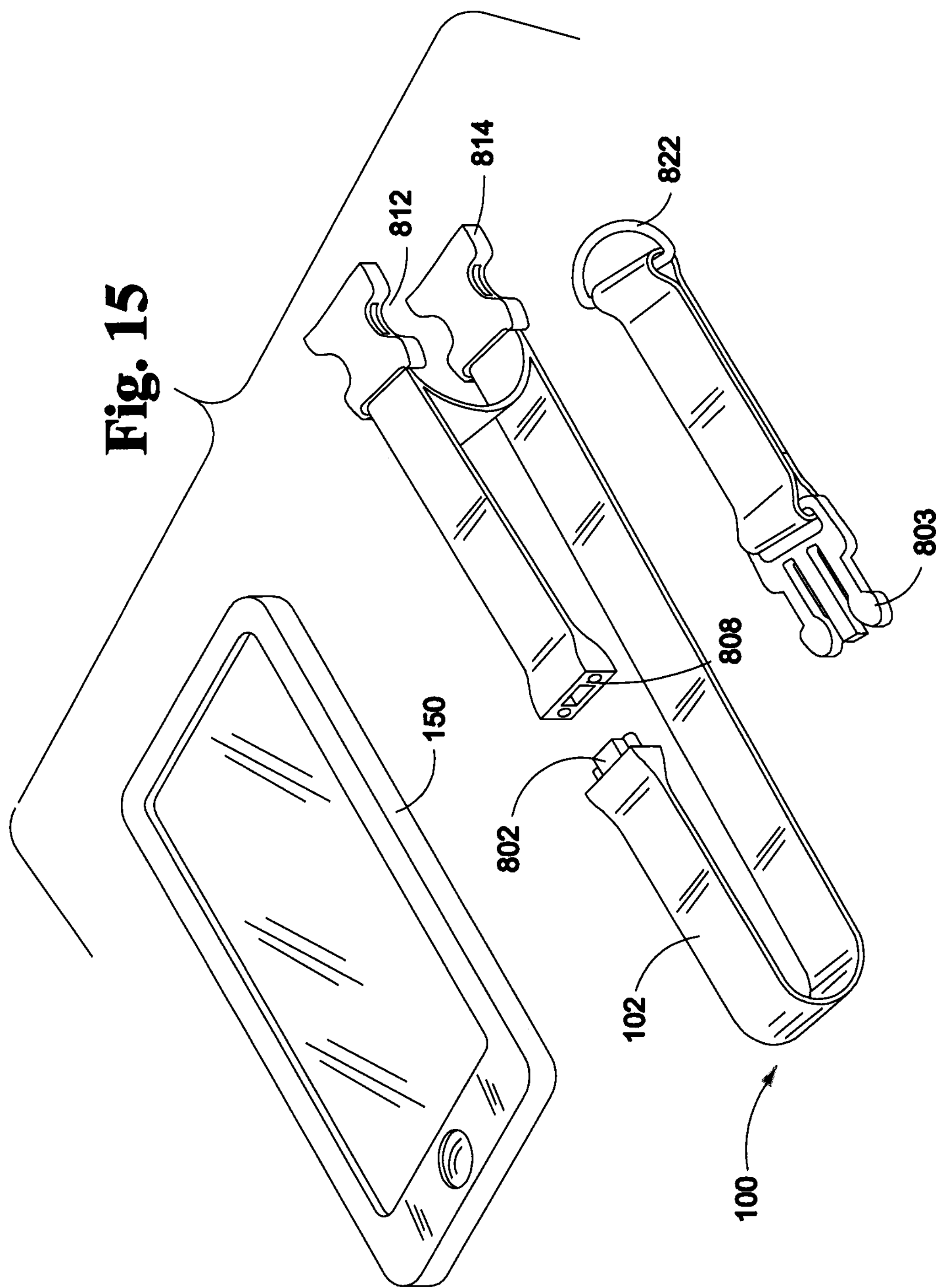
FIG. 15 is perspective view of a sixth embodiment of a modular multi-functional conference wearable system of the present invention.

Referring to FIG. 15, a sixth alternative embodiment of the system 100 of the present invention is shown. The apparatus 100 includes a first male electronics connector 802. It should be appreciated by one skilled in the art that the first male electronics connector 802 may be of any design used by electronic devices to transfer power and data, now known or in the future, including but not limited to Lighting® connector, Thunderbolt® connector, USB-C connector, micro-USB connector, or mini-USB connector. The first male electronics connector end 802 may also include one or more magnets 828 adjacent to either side of the first male electronics connector 802. The magnets 828 align with and are attracted to oppositely charged magnets 828 integrated into complimentarily designed modules. The first male electronics connector 802 is integrated with one or more lengths of wire to form a cable 104 to carry electrical current across the length of the device 100. As would be apparent to one skilled in the art, the wire, and the connections between them, would need to be insulated to form a cable 104 so as to protect a wearer from electrical shock. The first male electronics connector 802 can, optionally, be removably connected to an electronic device 150 and/or a complimentarily designed electronic device case.

Figure 19:
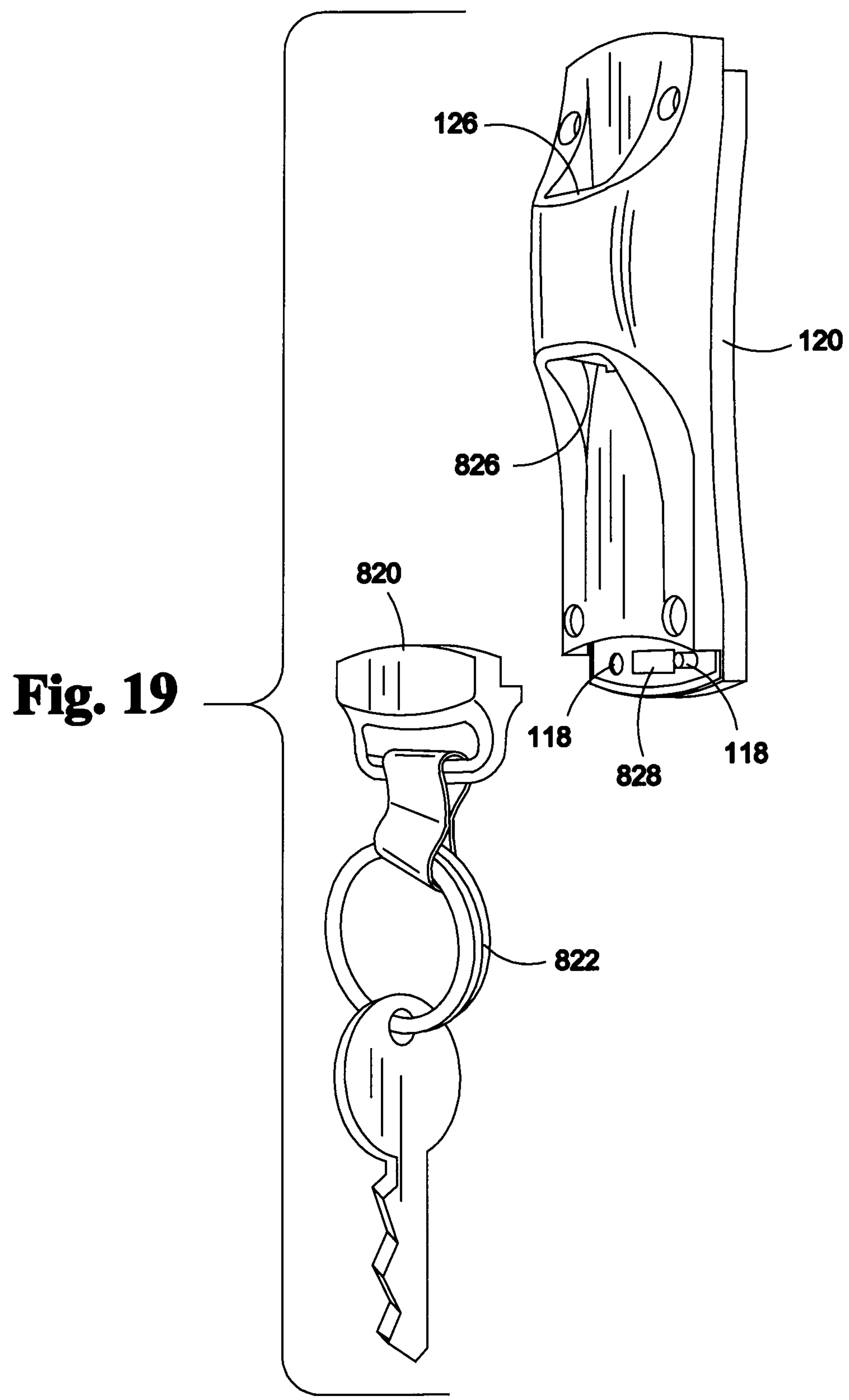
FIG. 19 is a perspective view of the seventh embodiment of a modular multi-functional conference wearable system magnetic connection mechanism of the present invention.

In this embodiment, the first male electronics connector 802 and a complimentarily positioned first female electronics connector 808 are interconnected through one or more segments of wire forming a cable 104 to create a single electrical path for energy and information flow. The first male electronics connector 802 is contemplated as a standard USB-A male connector. Similarly, the first female electronics connector 808 is contemplated as a standard USB-A female connector. However, it should be appreciated by one skilled in the art that any type of connector for power and data transfer, now know or in the future, may be used without departing from the scope of the invention. The first female electronics connector end 808 is found on the opposite side of the apparatus 100 from the first male electronics connector end 802. Additionally, in this alternative embodiment, it is contemplated that the charging cable 104 is surrounded in a cloth, fabric, plastic, or leather surround 102 around the entire length of the cable 110 so that only the first male electronics connector end 802 and first female connector end 808 are exposed. The first male electronics connector end 802 is contemplated to connect to a power brick or power source 120, as depicted in FIG. 19, that can be carried on a key ring 822 or interface with the first female receptacle 808 when in the lanyard configuration of the apparatus 100.

An additional feature of the system 100 depicted in FIG. 15 is the method in which it forms a lanyard loop. The first female electronics connector 808 receives and securely connects with the first male electronics connector 802 so as to form a loop of a majority of the apparatus 100. It is further contemplated to use a set of magnets 828 on either side of the first male electronics connector 802 that are placed complimentary to oppositely charged magnets 828 in the first female electronics connector 808. Alternatively, it is contemplated using one or more protrusions on either side of the first male electronics connector 802 that interface with complimentary receiving connection mechanisms within the first female electronics connector 808. In such a design, the protrusions next to the first male electronics connector 802 would be designed in such a way so as to avoid interfering with it and preventing it from interfacing with an external power or data source. Also depicted in FIG. 15 and contemplated for the alternative embodiment of the system 100 of the present invention is the integration of a key ring 122 proximally adjacent to a male mechanical connector 803. The male mechanical connector 803 can be releasably interfaced with the first female mechanical connector 812 or the second female mechanical connector 814. In this way, multiple mechanical modules may be connected to the system 100. However, it should be appreciated by one skilled in the art that alternative placements of the key ring 122 may be made without departing from the scope of the present invention.

Figure 16:
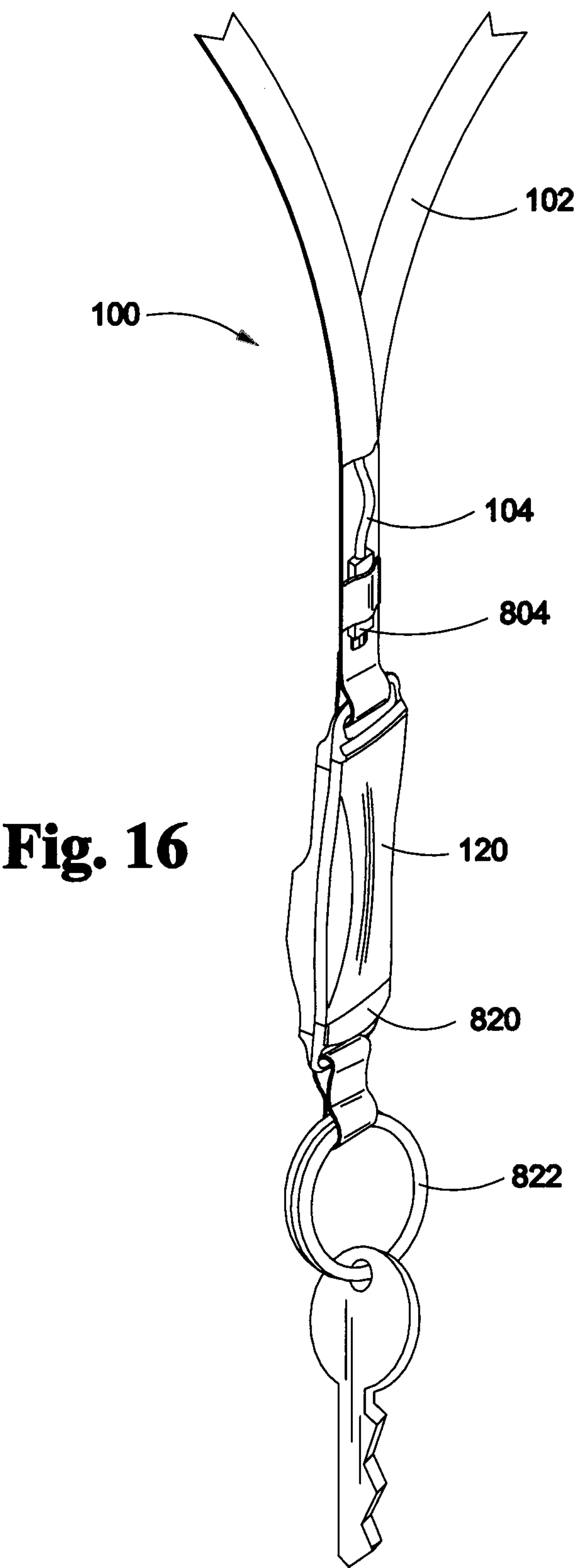
FIG. 16 is a rear perspective view of a seventh embodiment of a modular multi-functional conference wearable system, with attached modular battery with LED and modular key ring attachment, of the present invention.

Referring to FIG. 16, shown is a perspective view of the rear of a seventh alternative embodiment of the system 100 of the present invention. The system 100 includes a first male electronics connector end 802 and first male mechanical connector 803 as discussed in the sixth alternative embodiment of the present invention. Additionally, this alternative embodiment further includes a second male connector end 804. However, the first female electronics receptacle 808 and first and second female mechanical connectors 812 and 814 are not present on the lanyard 102 portion of the device 100. Instead the first male electronics connector end 802 (shown in FIG. 17) may interface with the battery module port 126 found on a complimentarily designed power module that adds functionality to the device 100. For example, it is contemplated that a battery module 110, a key ring 822, or name badge 130 or any other complimentarily designed device of sufficient weight to be held by the retention mechanisms of the device 100 and to be worn around a user's neck, may be attached. Other contemplated modules include, but are not limited to, a power charging brick, a speaker, or a wallet.

As depicted in FIG. 16 provided is the lanyard 102 connected to a battery module 110 and the battery module 110 successively connected to a key ring 822. The battery module 110 includes at least one charging port 126 shaped to receive the first male electronics connector 802 of the device 100 and includes one or more magnets 828 to aid in retention of the battery module 110 to the rest of the apparatus 100. However, it should be appreciated by one skilled in the art that any retention mechanism, now known or in the future, such as hook and loop mechanisms (Velcro®), mechanical prongs, and/or clips, may be utilized without departing from the scope of the present invention. In this embodiment, the internal batteries of the battery module 110 are connected to the charging port or ports 126 through a control panel that may include a second female electronics port 826 to allow a user to connect the battery module 110 to another power source to charge the battery module 110 or another electronic device 150 to be charged. Additionally, the control panel of the battery module 110 is contemplated to include a power button 122 and/or one or more LEDs 124 to indicate the charge level of the internal batteries of the battery module 110. It should be noted by one of ordinary skill in the art that although the first male electronics connector end 802 (shown in FIG. 17) and second male electronics connector end 804 are removably attached to one another on opposite sides of the lanyard 102 of the system 100 of the present invention using hook and loop attachments (Velcro®), any removably attachable connection mechanism may be utilized in any number of connection configurations without departing from the scope of the present invention.

Each battery module 110 of the seventh alternative embodiment houses a control circuit to regulate power delivered to attached electronic devices as well as a power button 122 to turn the internal batteries on or off. However, it should be appreciated by one skilled in the art that the control panel, control circuit, power button 122, and batteries, may be placed in any order in relation to one another without departing from the scope of the present invention. Additionally, it should be appreciated by one skilled in the art that one or more of the aforementioned components of the control panel, specifically the power button 118 or control circuit, may be altered or removed without departing from the scope of the present invention. Also contemplated to be included in the control panel is one or more LED lights 124 to indicate the power status of the internal batteries of the battery module 110. Again, it should be appreciated by one skilled in the art that the LED lights 124 may be placed in multiple locations along the charging cable 104, on the battery module 110, or removed entirely without departing from the scope of the present invention.

Figure 17:
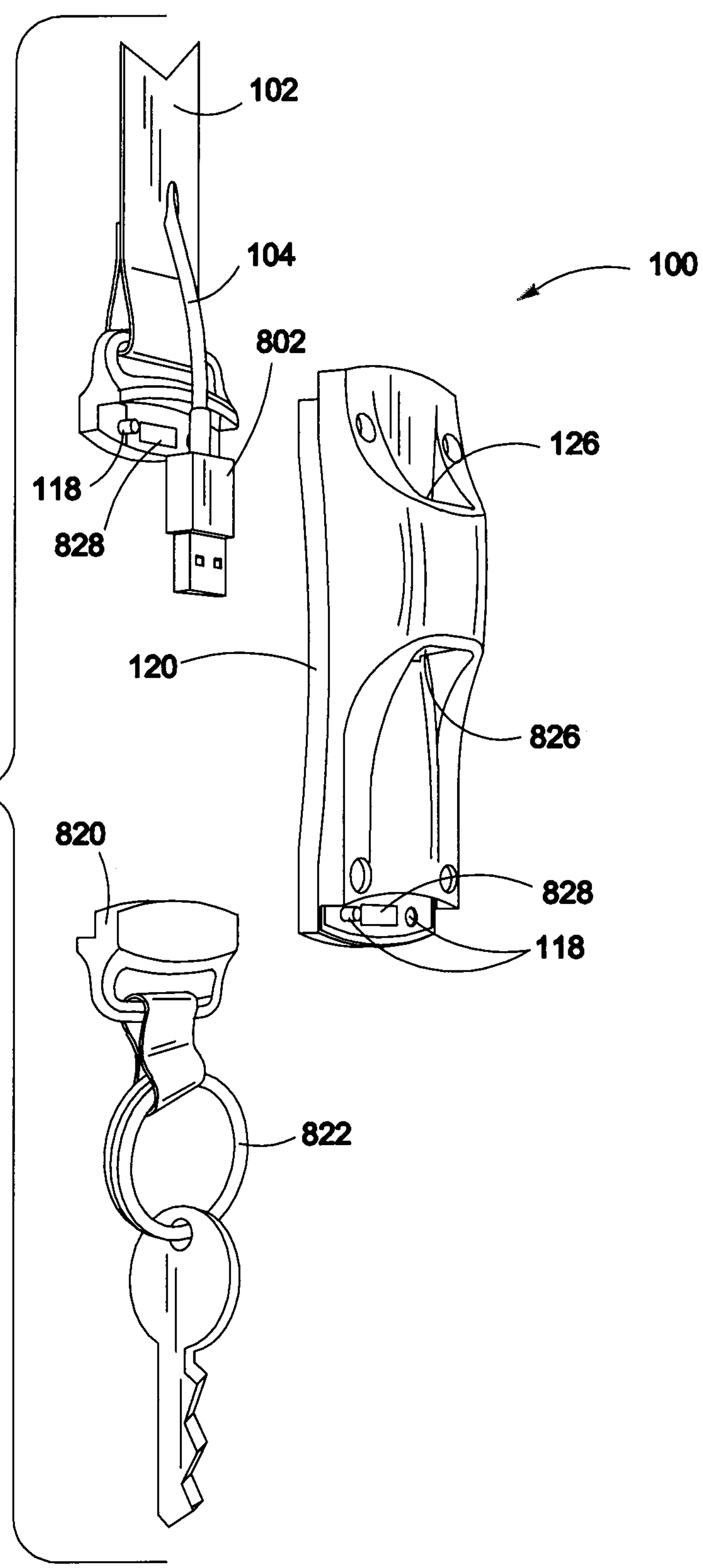
FIG. 17 is a perspective view of the seventh embodiment of a modular multi-functional conference wearable system, with the battery module detached from the lanyard charging cable and modular key ring, of the present invention.

Turning now to FIG. 17, shown is a perspective view of the front of the seventh alternative embodiment of the system 100 of the present invention. The first male connector end 802 is an electronic device interface connector and also includes one or more adjacent magnets 828. The first male connector end 802 interfaces with the charging port 126 of complimentarily designed modules such as the depicted battery module 110. The complimentary designed modules also include magnets 828 that are oppositely charged compared to the first male connector end's 802 adjacent magnets 828 and are placed adjacent to the charging port 126 of the battery module 110 so as to attract and connect with the opposing connector's magnets. This method of connection allows for a more secure, robust connection and retention mechanism between the lanyard 102 and the battery module 110 of the alternative embodiment of the present invention. This allows the user of the apparatus 100 the ability to carry connected modules on the looped cable 104 and/or lanyard 102 without worry of the connection failing even during vigorous movement of the apparatus 100. Also depicted in FIG. 17 is the detached key ring attachment module 820 that can be connected directly to the lanyard magnetic attachment 828 and retention mechanisms 118 or daisy chained and connected to the battery module's 110 distal magnetic attachment 828. Additionally, it is contemplated the key ring attachment 820 may comprise a first female receptacle 808 to receive and connect with the first male connector end 802 of the apparatus 100 and may also include one or more magnets 828 or other retention mechanism to assist in holding the key ring attachment 820 to the first male connector end 802 of the system 100. Moreover, it is contemplated a power brick may attach to the key ring 822 via a key ring attachment loop or to the first male connector end 802 of the system 100 via a first female receptacle 808 on the power brick that may include complimentarily designed magnets 828 or other retention mechanisms, as discussed above, that removably connect with and are complimentary to the retention mechanism of the first male connector end 802 of the system 100. Again, it should be appreciated by one skilled in the art that any retention mechanism with sufficient strength to assist in holding a module to the system 100 may be utilized without departing from the scope of the present invention.

Figure 18:
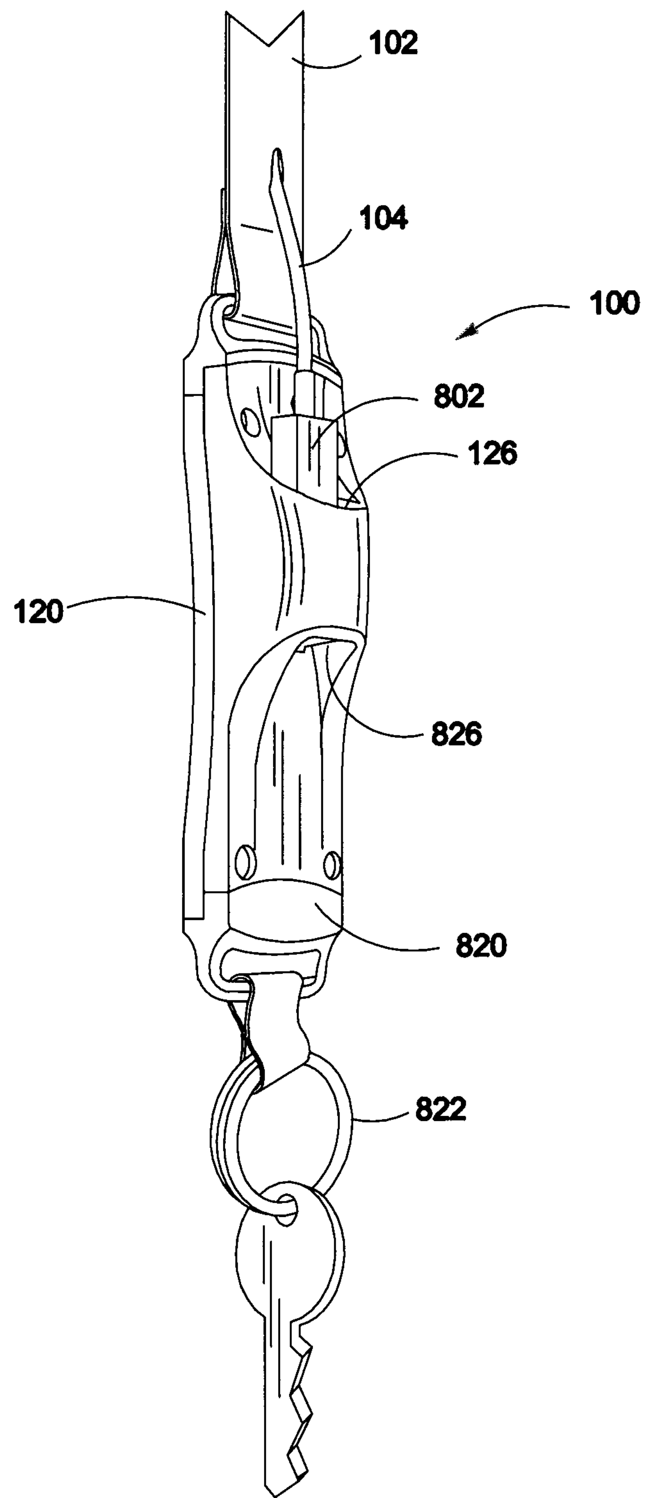
FIG. 18 is a front perspective view of the seventh embodiment of a modular multi-functional conference wearable system, with attached modular battery with LED and modular key ring attachment, of the present invention.

FIG. 18 depicts the perspective view of the front of the seventh alternative embodiment of the system 100 of the present invention as shown in FIG. 17 above, but with the battery module 110 and successive key ring module 120 attached. As depicted, the magnets 828 of each module and the cable 104 create a substantially seamless connection that can withstand vigorous movement as well as the typical forces encountered during a user's daily physical activities. Also depicted in FIG. 18 is the first male connector end 802 interfaced with the first female receptacle 126 of the battery module 110 that would allow an electronic device connected to the second male connector 804 (as shown in FIG. 16) to charge from the battery module 110.

FIG. 19 provides a close-up, perspective view of the magnetic mechanical retention mechanism 828 and 118 of the seventh alternative embodiment of the system 100 of the present invention. Provided is a magnet 828 in one module that is attracted to the magnet 828 housed within another module or the distal end of the lanyard 102. Also provided is one or more pegs and complimentarily sized openings to receive said pegs opposite one another on each respective module or between a module and the lanyard 102. This complimentary system of pegs and openings comprise the retention mechanism 118 of this alternative embodiment. Each successive end of a module and the second male connector end 804 of the cable 104 are designed to complement one another in size and shape to aid in the retention of one module to the next to the system 100 overall.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between a network connection of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

What is claimed is:

1. A modular charging system comprising:

a. a case with a first mechanical connector and a second mechanical connector;

b. wherein said first mechanical connector releasably interfaces with a first module;

c. wherein said second mechanical connector releasably interfaces with a second module;

d. wherein the case further comprises a retention mechanism to releasably interface with a power source, said power source including at least one port to connect a device to be powered; and e. wherein at least one of said first and second mechanical connectors comprises a channel having two side walls with a predetermined space between said two side walls and at least one traversing member integrally formed with one of said side walls and traversing said channel wherein said traversing member and at least one of said two side walls are configured to hold at least one of said first and second modules and wherein said traversing member is made of a material that will move when an object or force is asserted against it without permanently damaging said traversing member or said object.

2. The modular charging system of claim 1 wherein said first and second mechanical connectors are each selected from the group consisting of:

a. openings with rigid surrounds;

b. semi-flexible teeth;

c. clips;

d. magnets;

e. pegs;

f. prongs;

g. hook and loops;

h. Velcro®; and i. combinations thereof.

3. The modular charging system of claim 1 wherein said first and second modules are each selected from the group consisting of:

a. lanyard module;

b. body strap module;

c. key ring module;

d. power brick module;

e. name badge module;

f. wallet; and g. combinations thereof.

4. The modular charging system of claim 1 wherein said retention mechanism is shaped complimentarily to the shape of said power source.

5. The modular charging system of claim 1 wherein said power source further comprises an integrally formed storage area.

6. The modular charging system of claim 1 wherein said case further comprises an integrated electronic display powered by said power source.

7. The modular charging system of claim 1 wherein said power source is a sealed, portable battery module.

8. The modular charging system of claim 1 wherein said power source further comprises a toggle mechanism to turn the power source on or off and a status indicator to specify the power level of the power source.

9. The modular charging system of claim 1 wherein said case includes at least one slot sized to receive an identification or institution and/or entity issued card.

10. A modular wearable charging system comprising:

a. a case with a substantially flat display area and an opening comprising a retention mechanism on an opposing side to said substantially flat display area;

b. said case further comprising an upper mechanical connector and a lower mechanical connector;

c. wherein said upper mechanical connector is located above said substantially flat display area of said case and releasably interfaces with a first module;

d. wherein said lower mechanical connector is located below said substantially flat display area of said case and releasably interfaces with a second module;

e. wherein said retention mechanism releasably interfaces with a sealed, portable battery power source;

f. said sealed, portable battery power source comprising at least one port to connect to a device to be powered; and h. a first wall and a second wall integrally formed with said case and spaced apart from one another and wherein said second wall is integrally formed with a perpendicular member perpendicular to the orientation of the second wall that substantially traverses the opening between said first and second walls and wherein said perpendicular member is made of a material that will move when an object or force is asserted against it without permanently damaging said perpendicular member or said object.

11. The modular wearable charging system of claim 10 wherein said first and second mechanical connectors are each selected from the group consisting of:

a. openings with rigid surrounds;
b. semi-flexible teeth;
c. clips;
d. magnets;
e. pegs;
f. prongs;
g. hook and loops;
h. Velcro®; and
i. combinations thereof.

12. The modular wearable charging system of claim 10 wherein said first and second modules are each selected from the group consisting of:

a. lanyard module;
b. body strap module;
c. key ring module;
d. power brick module;
e. name badge module;
f. wallet; and
g. combinations thereof.

13. The modular wearable charging system of claim 10 wherein said display area comprises an electronic display.

14. The modular wearable charging system of claim 10 wherein said sealed, portable battery power source further comprises a control panel with a power toggle and a charge indicator.

15. The modular wearable charging system of claim 10 wherein said case further comprises a surface, opposite said display area, that includes at least one slot sized to receive an identification or institution and/or entity issued card.

16. A modular charging cable system comprising:

a. a first male connector end that comprises a first connector to interface with at least one external power or information source;

b. at least one length of wire protruding from said first connector end and connecting to a second male connector end forming a cable to interface with and charge at least one electronic device;

c. wherein said second male connector end includes one or more retention mechanisms comprising a second connector;

d. wherein at least one of said first and second connectors and said retention mechanisms releasably interface with at least one module;

e. said first and second male connector ends are releasably connected to form a loop;

f. wherein said retention mechanism is selected from the group consisting of:

i. openings with rigid surrounds;
ii. semi-flexible teeth;
iii. clips;
iv. magnets;
v. pegs;
vi. prongs;
vii. hook and loops;
viii. Velcro®; and
ix. combinations thereof;

g. a first female receptacle adjacent to said first male connector end to compliment and securely connect with said first male connector end to form a loop of said cable that may be worn as a lanyard; and h. wherein said first female receptacle further comprises an adjacent complimentary retention mechanism to the retention mechanism of the first male connector end that releasably connect with one another when said first female receptacle and said first male connector end are securely connected.

17. The modular charging cable system of claim 16 wherein said at least one module is selected from the group consisting of:

a. lanyard module;
b. body strap module;
c. key ring module;
d. battery module;
e. power brick module;
f. name badge module;
g. wallet; and
h. combinations thereof.

18. The modular charging cable system of claim 17 wherein said battery module further comprises a control circuit which further comprises a first female receptacle, a second female receptacle, and at least one battery cell.

19. The portable charging cable of claim 18 wherein said control circuit further comprises a power button and a charge indicator.

20. The portable charging cable of claim 17 wherein each of said modules comprises a complimentary retention mechanism to said second male connector end retention mechanism.

21. The portable charging cable of claim 16 wherein said cable is substantially covered by at least one material wherein said material is selected from the group comprising of:

a. cotton;

b. polyester;

c. leather;

d. plastic;

e. silk; and f. combinations thereof.

* * * * *